(12) United States Patent
Venkatesan et al.

(10) Patent No.: US 9,053,348 B2
(45) Date of Patent: Jun. 9, 2015

(54) SECURE CLOUD COMPUTING PLATFORM

(75) Inventors: Ramarathnam Venkatesan, Redmond, WA (US); Kenneth H. Eguro, Seattle, WA (US); Roy Peter D'Souza, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 13/430,598

(22) Filed: Mar. 26, 2012

(65) Prior Publication Data

US 2013/0254841 A1    Sep. 26, 2013

(51) Int. Cl.
*G06F 21/00* (2013.01)
*G06F 21/85* (2013.01)

(52) U.S. Cl.
CPC ..................................... *G06F 21/85* (2013.01)

(58) Field of Classification Search
CPC .......................................... G06F 21/85
USPC ............................................... 726/3; 713/153
See application file for complete search history.

(56) References Cited

U.S. PATENT DOCUMENTS

| | | | |
|---|---|---|---|
| 2008/0091763 A1* | 4/2008 | Devonshire et al. | 709/201 |
| 2008/0271134 A1* | 10/2008 | Johnson et al. | 726/13 |
| 2009/0113201 A1* | 4/2009 | Mackey et al. | 713/151 |
| 2009/0228704 A1* | 9/2009 | De Atley et al. | 713/156 |
| 2011/0179286 A1* | 7/2011 | Spalka et al. | 713/189 |
| 2011/0202983 A1* | 8/2011 | Pope et al. | 726/7 |
| 2011/0246721 A1* | 10/2011 | Crisan | 711/130 |
| 2011/0264920 A1* | 10/2011 | Rieffel et al. | 713/189 |
| 2011/0307633 A1* | 12/2011 | Maietta | 710/18 |
| 2012/0054345 A1* | 3/2012 | Sahu et al. | 709/226 |
| 2012/0060165 A1* | 3/2012 | Clarke | 718/104 |
| 2012/0185413 A1* | 7/2012 | Felter | 705/400 |
| 2012/0226799 A1* | 9/2012 | Kapur et al. | 709/224 |
| 2012/0304244 A1* | 11/2012 | Xie et al. | 726/1 |
| 2013/0042106 A1* | 2/2013 | Persaud et al. | 713/165 |
| 2013/0061310 A1* | 3/2013 | Whitmyer, Jr. | 726/9 |
| 2013/0091502 A1* | 4/2013 | Kang et al. | 718/1 |
| 2013/0111196 A1* | 5/2013 | Pasam et al. | 713/1 |

\* cited by examiner

*Primary Examiner* — Michael Pyzocha
(74) *Attorney, Agent, or Firm* — Heikki Einola; Judy Yee; Micky Minhas (57) ABSTRACT

A secure cloud computing platform. The platform has a pool of secure computing devices such that each can be allocated to a customer as with other computing resources. Each secure computing device may be configured by a customer with a key and software for performing operations on sensitive data. The customer may submit data, defining a job for execution on the platform, as cyphertext. The secure computing device may perform operations on that data, which may include decrypting the data with the key and then executing the software to perform an operation on cleartext data. This operation, and the data on which it is performed, though in cleartext, may be inaccessible to the operator of the cloud computing platform. The device may operate according to a secure protocol under which the software is validated before loading and the device is provisioned with a key shared with the customer.

20 Claims, 6 Drawing Sheets

SECURE CLOUD COMPUTING PLATFORM

BACKGROUND

In many computing applications it is desirable to keep data secure. For example, in a medical setting, regulations require that security measures be used to prevent patient data from being accessed by unauthorized parties. If financial data, such as credit card numbers or social security numbers for customers of a business, were obtained by malicious parties, large financial losses could occur.

To protect data, enterprises may maintain their own computer systems using various security techniques to prevent unauthorized access to data. The enterprise can use physical and electronic techniques to control access to secure data. An alternative approach to protect data, even when access to the data cannot be precluded in all cases, is to encrypt the data when stored in the computer system.

Data that has been encrypted—or otherwise processed such that, even if an unauthorized party accesses the data, that party cannot determine the meaning of the data—is sometimes called "cyphertext." In a corporate network, confidential data may be stored as cyphertext, except when actually being processed. By controlling the security information, such as encryption keys, that can convert cyphertext to "cleartext," security of the data can be maintained by limiting existence of data in cleartext except in highly restrictive settings that are secure.

More recently, data is being stored or processed in "the cloud." Cloud service providers—rather than the enterprises who have data to process—provide computing resources, including processing and database storage. Cloud service providers make computing resources available to the customers, each of which makes a service level agreement (SLA) with the cloud service provider to have access to a certain level of computing resources. The enterprises access these resources by submitting jobs over the Internet for processing on the computer resources "rented" from the cloud service provider.

Traditional techniques for maintaining data security in the cloud environment do not apply. Though data may be transmitted over the Internet as cyphertext, once it is received by the cloud service provider, it is, for many operations, converted to cleartext. As a result, employees of the cloud service provider, who are inherently outside the enterprise, have access to the cleartext data and possibly to the security information for converting the cyphertext to cleartext.

SUMMARY

A secure cloud computing service is provided by incorporating a programmable, secure computing device into a cloud computing platform. The secure computing device may be securely programmed with security information that may be used to protect customer data and instructions implementing a customer defined operation. This programming may occur without intervention by an operator of the cloud computing platform. As a result, even the operator of the cloud computing platform may be restricted from gaining access to sensitive customer data, either directly or by accessing information defining processing on that data.

During operation of the cloud computing platform to provide cloud computing services for a customer, the secure computing device may receive a set of instructions associated with the customer. The secure computing device may then be configured to perform an operation based on the received instructions. With such a configuration, the secure computing device may receive encrypted data and perform the operation on the encrypted data to generate processed data. The processed data may be further processed by a computing device of the cloud computing service or may be encrypted and stored on the cloud computing platform for future use or sent back to the customer.

In some embodiments, a cloud computing service may operate by allocating a secure computing device to a customer. Once allocated to a customer, the secure computing device may be configured to perform an operation specified by the customer based on security information associated with the customer. As encrypted data is received, the operation may be performed on the encrypted data.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that the utility of a cloud computing platform may be extended by equipping the cloud computing platform with a secure computing device. The secure computing device may serve as an interface between a network, over which a customer accesses the cloud computing platform, and one or more computing devices that provide computational resources within the cloud computing platform for that customer.

The secure computing device may be configured to perform an operation on cyphertext data submitted by the customer. This operation may entail decrypting the cyphertext data. Security may be maintained, despite the fact that the secure computing device is in the possession of and/or under the control of an operator of the cloud computing platform, because cleartext copies of sensitive data may be retained within the secure computing device. Less sensitive data may be processed outside of the secure computing device, such as by providing it to the cloud computing platform for greater efficiency.

For example, a secure computing device may be used to enable processing of sensitive medical information about individuals on a cloud platform. In this example, medical information may be transmitted as cyphertext to the cloud computing platform. Even if this transmission occurs over a public network, security of the data in transit may be maintained by encryption of the data.

Upon receipt at the cloud computing platform, this data may be decrypted within the secure computing device. Security of the data may be maintained, even though cleartext, because that data may be maintained within the secure computing device. Operations performed on the cleartext may generate data that is less sensitive, such that it can be transmitted outside of the secure computing device without destroying that security. In the case of individual health information, that processing may include aggregating the data or otherwise processing it such that sensitive, individual data is no longer recognizable in the cleartext data.

It should be appreciated that processing health information is just one example of the processing that may be performed on a cloud computing platform while maintaining data security. A platform as described herein may be used for any suitable processing, whether or not cleartext data generated as part of the processing is further processed on the cloud computing platform. In some embodiments, the secure computing device may be configurable for performing operations as specified by a customer to whom the secure computing device has been allocated and those operations may generate data for further processing in the cloud or for encryption and transmission to the submitter.

In some embodiments, the secure computing device may be implemented with physical security measures that prevent access to cleartext data being processed inside the device as part of normal operation of the secure computing device. Physical construction of the secure computing device may thwart, or at least significantly hamper, malicious activity intended to gain access to cleartext data by restricting access to cleartext data and/or security information used for secure processing within the device without physical modifications to the device. If physical modification to the device is required for unauthorized access, that unauthorized access can be readily detected and corrective measures can be taken to maintain security.

Accordingly, in some embodiments, the secure computing device may have an architecture such that cleartext data is only available inside a semiconductor device inside the secure computing device. Known techniques may be employed in constructing these semiconductor devices to ensure that cleartext data cannot be detected using electromagnetic, thermal and/or other non-destructive sensing technology. For example, a metal shield plate in the packaging of the semiconductor device and/or an architecture that ensures conductors carrying cleartext data are embedded within the device may be employed to ensure that signals on those conductors cannot be readily detected from outside the semiconductor device. Known techniques alternatively or additionally may be employed to hamper altering operation of the secure computing device that could lead to the secure computing device revealing secret information that it uses for secure processing of sensitive data. As another example, any wires on which cleartext data may appear outside of the semiconductor device package may be encased in epoxy or other material that would have to be physically altered to gain access to the cleartext data.

A suitable semiconductor device for implementing a secure computing device may be a programmable logic device, such as a field programmable gate array (FPGA). An FPGA may be used without modification or, in some embodiments, may incorporate features in addition to those in a conventional FPGA device to support additional functions of the secure computing device.

The secure computing device may employ one or more techniques to preserve security. Such techniques may entail performing processing on sensitive cleartext data only within internal components of the secure computing device such that, even an administrator of the cloud computing platform does not have access to the sensitive, cleartext data.

In embodiments in which the secure computing device is programmable, security may be maintained by verifying instructions to program the device prior to configuring the device with those instructions. Any suitable technique may be used to verify a set of instructions. In some embodiments, a set of instructions may be loaded into the secure computing device in a format that is encrypted, cryptographically signed or otherwise processed with security information. The secure computing device may perform cryptographic processing on the set of instructions to ensure that they were processed with security information corresponding to a trusted source.

In some embodiments, different types of information may be processed differently to maintain security. In some embodiments, the secure computing device may use a bootstrap process to load information that is known to be secure. The bootstrap process, for example, may rely on security information, such as a key, associated with the trusted source loaded into the secure computing device prior to operation of the device.

This pre-loaded security information, associated with a trusted source, may be used by the secure computing device to verify information provided during operation of the device. In some embodiments, the security information may be used by the secure computing device to verify configuration information that configures the device to perform secure operations for a specific customer. That configuration information may include further security information associated with the specific customer that can decrypt and/or encrypt data associated with operations performed for the specific customer. Alternatively or additionally, the configuration information may include a loader program, which can load a set of instructions provided by the customer to perform a secure operation. The loader program may be adapted to operate with the security information associated with the specific customer such that programming of the secure computing device is limited to that specific customer.

Such an approach provides significant flexibility in configuring the secure computing device, without access to any secure information by the operator of the cloud computing platform. To allow the cloud platform to be used for secure processing for a specific customer, the operator of the cloud computing platform may allocate a secure computing device for use by the specific customer. Thereafter, the secure computing device may automatically interact with a trusted authority and/or the specific customer to which it has been allocated.

Figure 1:
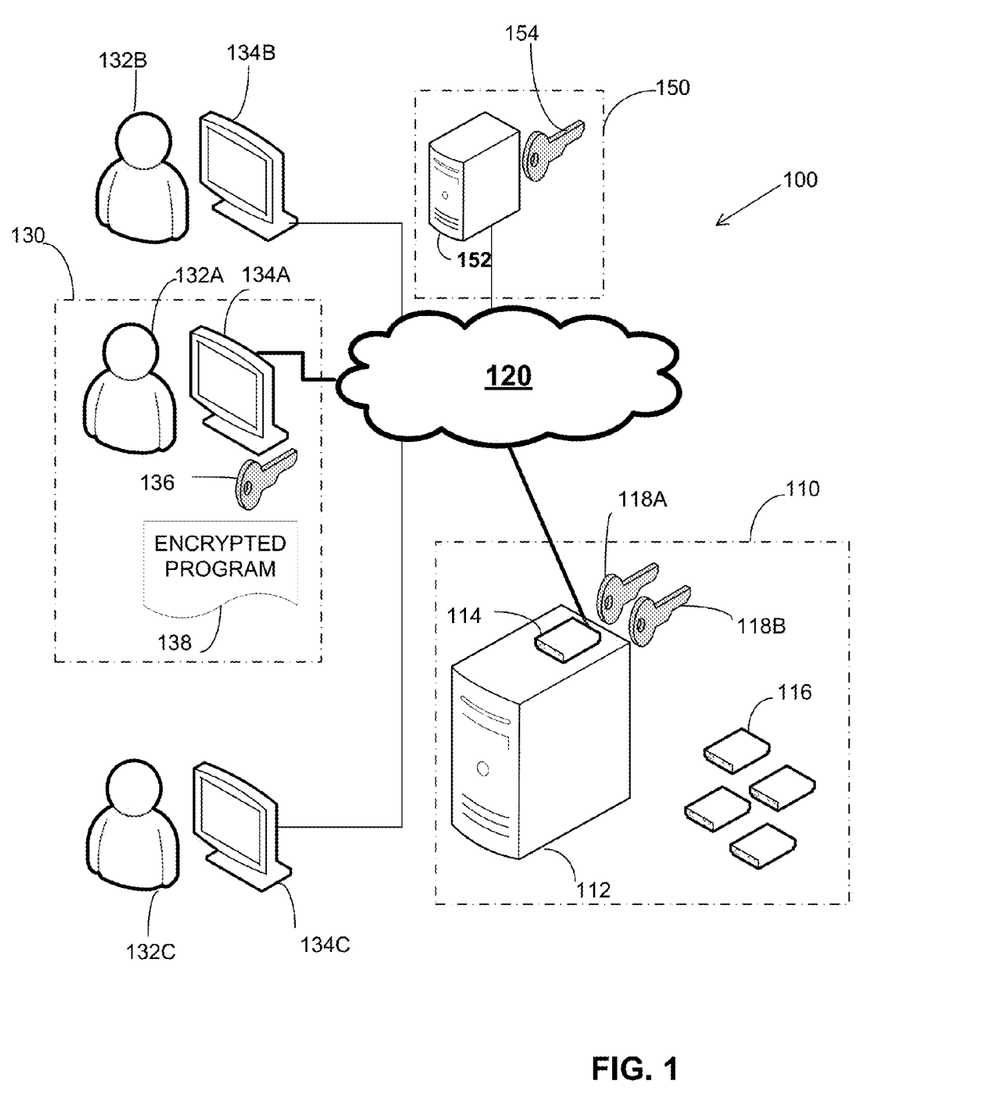
FIG. 1 is a sketch of an exemplary embodiment of a cloud computing platform utilizing a secure computing device.

Turning to FIG. 1, an exemplary computing environment 100 is illustrated. Environment 100 includes a cloud computing platform 110. As in a conventional cloud computing environment, cloud computing platform 110 includes processing resources. In this example, those processing resources are illustrated by computing device 112. Though FIG. 1 shows a single computing device 112 within cloud computing platform 110, it should be appreciated that a cloud computing platform may have numerous computing devices that, in operation, are allocated to customers procuring computing services from an operator of cloud computing platform 110. Accordingly, it should be appreciated that many details of a cloud computing platform are omitted from FIG. 1 for simplicity.

FIG. 1 shows multiple customers that may access cloud computing platform 110. In this example, access to cloud computing platform 110 is made over network 120. Network 120 may be a public network, such as the Internet. In this example, three customers, customers 132A, 132B and 132C, are illustrated. Three customers are illustrated for simplicity, and it should be appreciated that a cloud computing platform may support many more than three customers. Moreover, each of the customers 132A, 132B and 132C is illustrated as an individual. Though one or more individuals may control interaction with a cloud computing platform, in some embodiments, the customers of the cloud computing platform 110 may be companies or other enterprises.

Regardless of the number and nature of customers, each of the customers may interact with the cloud computing platform 110 through a client computing device. In the example of FIG. 1, client computing devices 134A, 134B and 134C are shown used by customers 132A, 132B and 132C, respectively. Through such a client computing device, computing jobs may be sent to cloud computing platform 110 for execution. The submission of jobs to cloud computing platform 110 may be done using techniques as are known in the art. As a specific example, each of customers 132A, 132B and 132C may have a service level agreement (SLA) with an operator of cloud computing platform 110. The SLA may specify that, upon submission of a job, cloud computing platform 110 may allocate processing resources for performing that job. Various parameters relating to the number and timing of resources allocated for a job may be dictated by terms of the SLA in place between the specific customer submitting the job and the cloud computing platform. For example, cloud computing platform 110 may allocate processing, memory and network resources for performing a job submitted by a customer using techniques as are known in the art. However, the specific terms of the SLA and the manner in which computing resources are allocated to a job is not critical to the invention.

In addition to allocating computing resources as is known in the art, cloud computing platform 110 may allocate to a customer a secure computing device. Allocation of a secure computing device may enable a job to operate on secure data, while restricting access to that data. In the scenario illustrated in FIG. 1, customer 132A is submitting a job to cloud computing platform 110. For processing that job, and other secure jobs submitted by customer 132A, cloud computing platform 110 has allocated secure computing device 114.

In the embodiment illustrated in FIG. 1, cloud computing platform 110 allocates the secure computing devices to customers with a one to one relationship. Each customer submitting a secure job may be allocated a secure computing device. In this example, the secure computing device operates as an interface between network 120 and computing resources, such as computing device one 112, which may be used in processing a portion of a secure job.

It should be appreciated that though FIG. 1 shows a one to one relationship between customers and secure computing devices, the invention is not so limited. In some embodiments, each secure computing device may be configured to process secure jobs from multiple customers. Conversely, a single customer may have allocated to it multiple secure computing devices.

Allocation of a secure computing device may occur at any suitable time. Allocation, for example, may occur when an SLA with the customer, specifying secure computing, is formed. Alternatively or additionally, the secure computing device may be allocated when such a customer indicates that cloud computing platform 110 is to perform a secure job. Such indication may be provided in any suitable way, including by submission of the secure job.

Regardless of when the allocation occurs, FIG. 1 illustrates that cloud computing platform 110 may contain a pool 116 of secure computing devices. When a secure computing device is allocated to a customer, a secure computing device may be removed from the pool 116 and made available for use by that customer. Any suitable mechanism may be used for allocating a secure computing device. In some embodiments, for example, the secure computing device is installed within a larger computing device providing computing resources for the cloud computing platform. In such a scenario, allocating a secure computing device may entail physically installing the secure computing device in hardware providing computing resources. In other scenarios, the pool 116 of secure computing devices may be made up of devices is already installed in other computing hardware.

Regardless of the manner in which the secure computing device is allocated, allocation may entail configuring cloud computing platform 110 such that secure jobs submitted by the customer to which the secure computing device has been allocated will be routed to that secure computing device. Any suitable mechanism may be used for routing secure jobs from a specific customer to a specific secure computing device. For example, though not expressly shown in FIG. 1, a cloud computing platform may include a scheduler or similar component that allocates jobs to specific physical resources. The scheduler, for example, may be configured to route jobs from a specific customer to a secure computing device allocated to that customer.

When a secure computing device is allocated for use by a specific customer, the secure computing device may be configured to perform secure operations submitted by that customer. Such a submission from a customer may be based on a set of instructions that programs the secure computing device to perform the secure operation. Alternatively or additionally, submission of a secure operation may entail supplying encrypted data to be used in performing the operation. Accordingly, the secure computing device may be configured to receive and apply a set of operations as well as to decrypt and/or encrypt data exchanged with the customer.

To maintain security of the secure computing device, the secure computing device may be constructed to reject configuration information unless provided by or verified by (such as in the form of signed binaries or user verification via key validation) a trusted source. In the example of FIG. 1, a trusted authority 150 is illustrated. Trusted authority 150 may interact with both the specific customer 132A submitting a secure job and the secure computing device 114 allocated to that customer.

Any suitable process may be used to validate configuration information submitted to secure computing device 114. In the embodiment illustrated, a bootstrap process is used. As part of the bootstrap process, trusted authority 150 may program secure computing device 114 with a loader, which can receive, validate and install a set of instructions from the specific customer to perform a secure operation. In addition, as part of the bootstrap process, trusted authority 150 may provide the secure computing device with security information that can be used to validate a set of instructions provided by the customer to perform the secure operation. Alternatively or additionally such security information may be used to decrypt and/or encrypt data exchanged with the customer during performance of the secure operation.

Trusted authority 150 may also interact with a specific customer to provide that customer with information that will enable the customer to provide a set of instructions that the secure computing device can validate. Interaction between trusted authority 150 and a specific customer may also entail provisioning the customer with security information for encrypting and decrypting data exchanged with the secure computing device.

To support such interactions, trusted authority 150 may generate and/or possess security information, such as key 154. Key 154 may be any suitable key generated in any suitable way, including using cryptographic techniques as are known in the art. Key 154 may be used to validate communications from a computing device, such as server 152, operated by trusted authority 150. Trusted authority 150 may use key 154 to encrypt, sign and/or otherwise cryptographically process information. Any of the devices illustrated in FIG. 1 that receive communications from trusted authority 150 may have complementary security information such that, upon receiving information from trusted authority 150, the device may decrypt, validate the signature and/or perform other cryptographic processing to access or verify that the information was generated by trusted authority 150.

In the example illustrated, secure computing device 114 is provisioned with a complementary key 118A. Complementary key 118A and key 154 may be in any suitable format. In some embodiments, those keys may be symmetric keys. In other embodiments, the keys may form a public key/private key pair. For example, key 154 may be a public key and key 118A may be a private key of a public key/private key pair. Server 152 and secure computing device 114 may be provisioned with keys 154 and 118A in any suitable way. In some embodiments, server 152 may be operated within a physically secure environment provided by trusted authority 150. Within that environment, server 152 may be operated to generate the appropriate keys 154 and 118A.

Key 118A may be distributed to secure computing device 114 in any suitable way. For example, in some embodiments, a key exchange protocol may be performed across public network 120. In other embodiments, secure computing device 114 may be provisioned with key 118A while connected to server 152 in a secure environment. For example, secure computing device 114 may be physically moved to a secure environment operated by trusted authority 152 be provisioned with key 118A.

With key 118A, secure computing device 114 may receive and validate information from trusted authority 150. That information may include a set of instructions to configure secure computing device to receive and load an encrypted program from a customer. Alternatively or additionally, the information may include further security information so that secure computing device 114 can validate that the program was generated for a specific customer, such as customer 132A. In the example of FIG. 1, that further security information may be a key 118B.

In this scenario in which a secure function is to be received from a specific customer, such as customer 132A, that customer may have a complementary key. In this example, customer 132A has a complementary key 136. In the example illustrated, customer 132A maintains key 136 in a secure environment 130. Secure environment 130, for example, may be created in a private physical and network environment maintained customer 132A. As with other security information, key 118B and complementary key 136 may be of any suitable format. The keys, for example, may be symmetric keys.

Alternatively, the keys may be a public key/private key pair. Though, it should be appreciated that any suitable keys that can be used to encrypt, sign and/or otherwise cryptographically process information and also perform inverse operations may be used. In scenarios in which a public key/private key pair is used, and the secure computing device 114 holds the private key of the pair, any user may contact secure computing device 114 without a priori knowledge of a shared secret.

In this example, customer 132A may prepare a program for secure computing device 114. The program may contain a set of instructions that, when executed on secure computing device 114, performs a secure operation. Customer 132A may prepare the program in secure environment 130. With key 136, that program may be converted to an encrypted program 138 or otherwise cryptographically processed to prevent unauthorized access and/or unauthorized modification to the program.

Encrypted program 138 may then be communicated across public network 120 to secure computing device 114. Secure computing device 114 may use key 118B, which is complementary to key 136, to process encrypted program 138 as received. This processing may verify that encrypted program 138 was generated by customer 132A to which secure computing device 114 has been allocated. Upon verification and, if encrypted, decryption, secure computing device 114 may be configured to execute encrypted program 138 of encrypted program 138.

Secure computing device 114 may then execute encrypted program 138 to perform an operation requested by customer 132A. In scenarios in which execution of encrypted program 138 uses data, that data may be provided by customer 132A also over network 120. To maintain the security of the data, that data may be encrypted with key 136 or other security information. Upon receipt, secure computing device 114 may decrypt the data with key 118B or other key that is complementary to the key used to encrypt the data. In this way, both the program to perform a desired operation and the data on which that operation is to be performed is securely made available with in secure computing device 114 without providing an opportunity for a malicious party to intercept or alter either the program or the data as it is conveyed over network 120. The data and program art even protected from being intercepted or altered by an administrator of cloud computing platform 110, where the operation is executed on the data.

Figure 2:
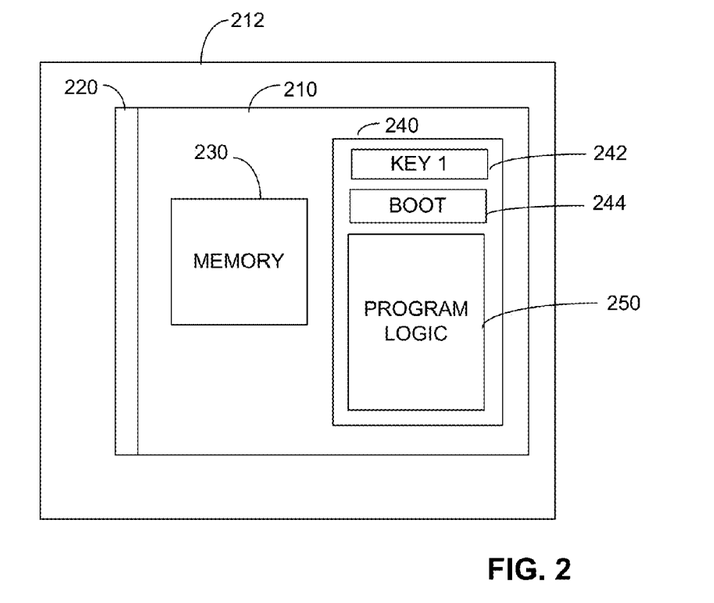
FIG. 2 is a functional block diagram of an exemplary embodiment of a cloud computing device incorporating a secure computing device.

Secure computing device 114 may be implemented in any suitable way. Moreover, secure computing device 114 may be integrated into cloud computing platform 110 in any suitable way. However, an example of a secure computing device, and its integration into a cloud computing platform, is provided in connection with FIG. 2. FIG. 2 illustrates a server 212, which may be a server providing computational resources for a cloud computing platform. In this example, the secure computing device is implemented as a printed circuit board 210 installed within server 212.

Any suitable technique, including techniques as are known in the art, for installing a computing device implemented as a printed circuit board in a server may be used. In this example, a standard internal bus interface is used. Accordingly, printed circuit board 210 is shown with a bus interface 220. In this specific example, server 212 may be implemented with a Peripheral Component Interconnect (PCI) bus as is known in the art. As a specific example, the bus may be at PCI express bus. In that scenario, printed circuit board 210 may include electronic components providing an interface 220 to the PCI express bus.

Printed circuit board 210 may be manufactured using known printed circuit board manufacturing techniques. Those techniques may include attaching multiple semiconductor devices to the printed circuit board and interconnecting them through conductive traces of the printed circuit board. Any suitable number and type of components may be attached to printed circuit board 210. For example, though not expressly illustrated in FIG. 2, printed circuit board 210 may contain control circuitry that performs functions as described herein, such as receiving and routing data. For simplicity, in the example of FIG. 2, only two components on board 210 are illustrated.

FIG. 2 illustrates that a memory 230 and a programmable logic device 240 may be attached to printed circuit board 210. Though shown as a single device, memory 230 may be implemented using multiple semiconductor devices. In this example, memory 230 may be a non-volatile memory. In operation, memory 230 may store information used to configure programmable logic device 240. Information may be loaded from memory 230 into programmable logic device 240 upon power up of printed circuit board 210 or at any time during operation when the configuration of programmable logic device 240 is to change.

Programmable logic device 240 may be any suitable programmable logic device, including a field programmable gate array (FPGA) constructed using techniques as are known in the art. In some embodiments, a single FPGA chip may be employed such that operations on secure data as described herein are performed entirely within a single chip. Though, in other embodiments, multiple chips may be used, and the processing may be partitioned such that all cleartext data is retained within the chip in which it is decrypted or other steps taken to ensure the security of the processing operations.

Regardless of the specific implementation of programmable logic device 240, the device may include programmable logic 250. Programmable logic 250 may be implemented using techniques as are known in the art or in any other suitable way. As one example, programmable logic 250 may be implemented as a gate array. Though, regardless of the manner in which programmable logic 250 is implemented, for operation of the secure computing device, programmable logic 250 may be programmed to perform an operation securely.

To ensure the security of such an operation, in some embodiments, a set of instructions used to configure program logic 250 may be validated prior to using the set of instructions to configure program logic 250. Validation may be based on determination that the set of instructions was prepared by an authorized source and/or checking that the set of instructions does not contain instructions that, when executed, would compromise security. Printed circuit board 210 may include one or more components to validate a set of instructions. In the embodiment illustrated, the component of printed circuit board 210 that performs the validation may be contained within programmable logic device 240. As a specific example, commercially available FPGAs contain keys storage 242 and bootstrap circuitry 244. Bootstrap circuitry 244 can receive a set of instructions and, using a key stored in the key storage 242 validate the set of instructions. If the set of instructions is validated, bootstrap circuitry 244 may configure program logic 250 with that set of instructions. If the set of instructions is not validated, it is not used to configure program logic 250.

For added security, programmable logic device 240 may be implemented such that there is no normal operating mechanism by which information stored in key storage 242 or the configuration of bootstrap circuitry 244 may be altered. Accordingly, in the embodiment illustrated in FIG. 2, a key may be written into key storage 242 prior to that time that circuit board 210 is placed into operation. As a specific example, a value may be written into key storage 242 before board 210 and/or programmable logic device 240 are installed in server 212.

Figure 3A:
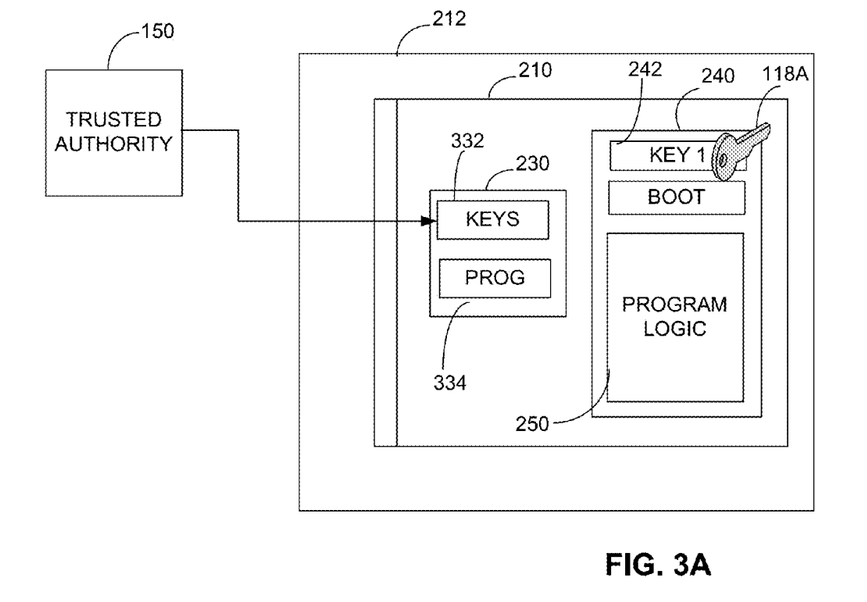
FIG. 3A . . . 3E are functional block diagrams illustrating configuration and operation of the secure computing device of FIG. 2.

FIGS. 3A . . . 3D illustrate a mechanism by which these components may be used to configure the secure computing device to securely perform operations submitted by a customer of the cloud computing platform operating server 212. FIG. 3A illustrates that key 118A has been stored in key storage 242 and board 210 is ready for operation within server 212.

In some embodiments, a computing platform may contain a pool (116, FIG. 1) of secure computing devices. Such a pool may be implemented by installing multiple boards such as board 210 in a server, such as server 212. Alternatively or additionally, multiple servers providing computing resources for a cloud computing platform may contain one or more boards, like board 210. Each such board may be configured with a key associated with a trusted authority. In some embodiments, each such board may be programmed with the same key. Though, in some embodiments, every board may have a different key or subsets of the boards making a pool of secure computing devices may share the same key, but with different subsets having different keys.

Regardless of the number of unique keys used across the pool of secure computing devices, in the embodiment illustrated, the keys are associated with a trusted authority rather than with a specific customer. Additional information may be uploaded to board 210 to configure the board for a specific customer. This upload may be performed after the board is allocated for use by a specific customer. FIG. 3A shows that further information may be uploaded and stored on board 210 to configure board 210 to securely perform operations on behalf of a specific customer to which board 210 is allocated.

In the example of FIG. 3A, trusted authority 150 provides information that begins the customer specific configuration of board 210. The information may be provided in any suitable way. For example, in the embodiment illustrated in FIG. 1, information may be provided from trusted authority 150 over network 120. The information may be transmitted in accordance with a protocol that specifies board 210 as the destination of the information. Any suitable protocol may be used for this purpose. For example, a protocol that incorporates an endpoint address may be used with a MAC address or other similar identifier for board 210 serving as the endpoint address.

In other embodiments, the cloud computing platform may perform a routing function. Rather than identify a specific board, information sent by trusted authority 150 may identify the customer for which the information is sent. Server 212 or other component of the cloud computing platform may determine the specific board, such as board 210, allocated for the customer and route the information to that board through PCI interface 220 or using any other suitable system interface.

Information sent by trusted authority 150 may be encrypted, signed and/or otherwise cryptographically processed such that it can be decrypted, verified or otherwise accessed using key 118A. In this example, that information includes keys 332 and a set of instructions 334. This information may be communicated from trusted authority 150 to board 210 while it is in a cluster computing platform. The information may be transmitted over network 120, which is not a secure network. Accordingly, the information may, in this embodiment, be encrypted.

In this example, keys 332 represents security information that may be used to encrypt and decrypt data exchanged with the specific customer. Keys 332 may be one or more keys and may be represented in any suitable way. For example, each key may be a string of characters used in a cryptographic function. Alternatively or additionally, each key may be a set of instructions that define a cryptographic function.

Regardless of how the keys are represented, they may represent keys that are complementary with keys held by the specific customer to which board 210 is allocated for operation as a secure computing device. Keys 332 may be symmetric, such that the specific customer may have a similar key. Alternatively or additionally, keys 332 may be one or more keys, each of which is a key of a public key/private key pair. In some embodiments, keys 332 may constitute a public key for decrypting information sent by the specific customer and a private key for encrypting information sent to the specific customer.

In some scenarios, more than one public or private key may be programmed in keys 332. For example, board 210 may be configured to receive data from multiple client computers, each using a different private key. In that scenario, board 210 may be configured with multiple public keys for decrypting such data. Alternatively, board 210 may be configured to distribute data to multiple client computers, each configured using a different key. In that scenario, board 210 may be configured with keys to encrypt the data to be sent to each of the client computers.

In addition to keys 332, trusted authority 150 may upload to memory 230 a set of instructions 334 that, when applied to programmable logic 250 configure program logic 250 to implement a loader. The loader may operate to receive a further set of instructions defining a secure operation to be performed on behalf of a specific customer to which board 210 has been allocated.

Figure 3B:
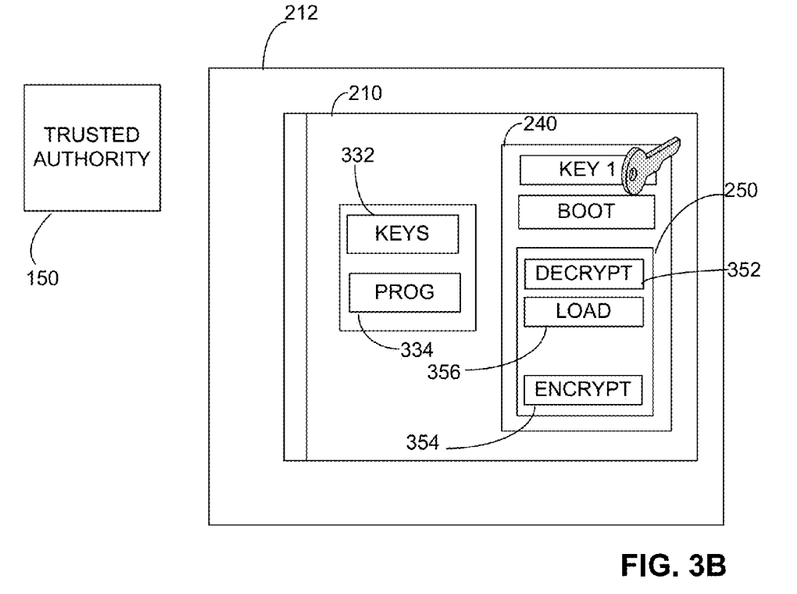

In this example, information configuring board 210 to receive information associated with a specific customer may be stored in nonvolatile memory 230. This information may be accessed upon power up of board 210 to configure programmable logic 250. FIG. 3B illustrates an operating state in which the information initially stored in nonvolatile memory 230 is used to configure programmable logic 250.

In the state shown, keys 332 have been processed by boot circuitry 244 and used to create decrypt component 352 and encrypt component 354 within programmable logic 250. In this embodiment, boot circuitry 244 validates keys 332 before configuring program logic 250 based on those keys. Accordingly, FIG. 3B illustrates a scenario in which keys 332 have been validated because decrypt component 352 and encrypt component 354, representing configuration based on keys 332, exist in program logic 250.

Decrypt component 352 and encrypt component 354 may implement any suitable function or functions based on keys 332. For example, decrypt component 352 may implement a decryption function based on a key associated with the specific user for which board 210 is configured to operate. The specific decryption function is not critical to the invention and may be changed dynamically by reprogramming programmable logic 250. This decryption function may be performed on data received from the customer. Likewise, encryption component 354 may perform an encryption function on data being returned to that customer or sent to a destination specified by the customer.

Any suitable technique may be used to generate keys 332 in a way that, when processed by boot circuitry 244, programmable logic 250 is configured to perform the specified encryption and decryption functions. As an example of a suitable techniques for generating keys 332, programming tools for FPGA devices may be used to specify the encryption and/or decryption functions. Such tools may generate a set of instructions that may be provided to trusted authority 154 signing, encryption or other cryptographic processing by trusted authority 150 such that boot circuitry 244 will recognize the information as valid configuration information.

Similarly, a set of instructions 334 may be generated such that, when processed by boot circuitry 244, programmable logic 250 is configured with a loader 356. Loader 356, when executed, may receive a further set of instructions specifying an operation from a customer and configure a further portion of the programmable logic 250 to perform that operation. Set of instructions 334 may similarly be generated by an FPGA programming tool and provided to trusted authority 150 for formatting in a way that boot circuit 244 will recognize instructions 334 as a valid, trusted set of instructions.

Figure 3C:
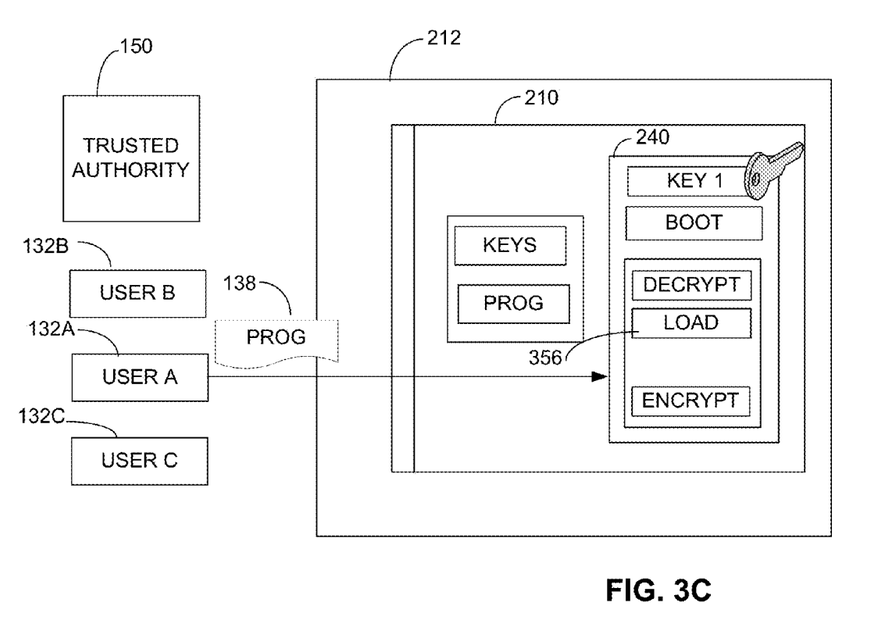

With this configuration, board 210 may interact with the specific customer for which board 210 is configured. In the example of FIG. 3C, board 210 is configured to operate with customer 132A. As shown, customer 132A may transmit encrypted program 138 to board 210. As with information sent by trusted authority 150, this information may be transmitted in accordance with a protocol that allows the information to be routed to the appropriate board 210 allocated to a customer 132A.

In the example illustrated, encrypted program 138 is received based on interactions with loader 356. Loader 356 may decrypt encrypted program 138, in accordance with cryptographic processing loader 356 is configured to perform. Loader 356 may then program further portions of programmable logic 250 to implement an operation defined by encrypted program 138.

Figure 3D:
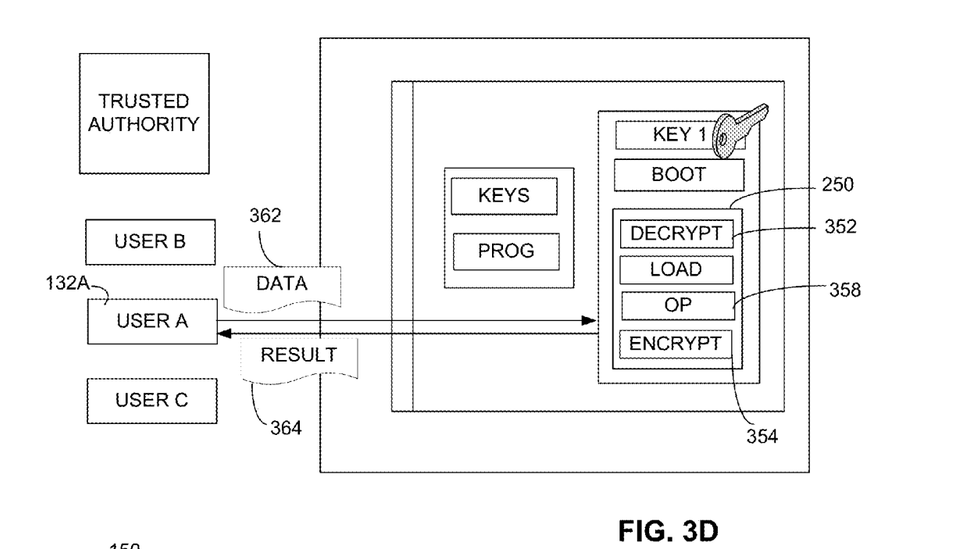

FIG. 3D illustrates programmable logic 250 configured to perform an operation 358. As with other sets of instructions, that are used to configure programmable logic 250, encrypted program 138 may be formed in any suitable way. In embodiments in which board 210 contains an FPGA for securely performing operations, the program may be formed with known FPGA programming tools. Once a set of instructions is generated with the FPGA programming tools, that set of instructions may be encrypted using a key or other security information that is complementary to the security information that loader 356 is configured to apply upon receiving encrypted instructions 138. This processing may be performed in secure environment 130 (FIG. 1) or other location deemed secure by customer 132A.

As with boot circuitry 244, loader 356 may be configured so as not to configure programmable logic 250 with a set of instructions unless that set of instructions is validated. In contrast to boot circuitry 244, which relies on a cryptographic function performed by trusted authority 150 to determine whether to configure a portion of programmable logic 250 with a set of instructions, loader 356 may rely on a cryptographic function performed by the specific customer to which board 210 has been allocated.

Configured with this set of instructions, board 210 may then perform an operation securely based on data securely transmitted from the specific customer to which board 210 is allocated. FIG. 3D shows such operation. In that example, customer 132A, to whom board 210 has been allocated, transmits encrypted data 362. That data may be transmitted in accordance with a protocol by which server 212, or other component of the cloud computing platform, routes data 362 to board 210. Data 362 may be decrypted in decrypt component 352. That data may then be processed in accordance with operation 358.

In this example, processing as part of operation 358 may be performed on cleartext data. Though performed on cleartext data, the processing may be performed securely because parties without the security information used to program board 210 and encrypt data 362 are unable to access the data in cleartext form or even determine the processing performed on that data because such cleartext data and processing exists within the FPGA or other semiconductor device on board 210.

Following processing, the results generated may be used in any suitable way. In some embodiments, the results, which may be in cleartext form, may be transmitted back to customer 132A or other destination specified by the customer. For transmission over network 120, or other insecure communications medium, the resulting data may be encrypted by encrypt component 354. In such an embodiment, results may be returned as encrypted results 364.

Though, is not a requirement that the generated data be encrypted within programmable logic device 240. In some embodiments, the results of performing operation 358 may be data that is not regarded as sensitive. For example, personally identifiable data may be aggregated as results of operation 358 such that the resulting data, though cleartext, does not reveal any sensitive information. In such a scenario, that data may be processed asked cleartext data in server 212 or other component within the cloud computing platform.

In other scenarios, if the environment of server 212 is regarded as sufficiently secure given the level of sensitivity of the resulting data, the resulting data, even if regarded as sensitive, may nonetheless be processed in server 212 or other component of the cloud computing platform.

Regardless of any additional processing following execution of operation 358, the resulting data may, in some embodiments, be returned to board 210 for further processing. That processing may include encryption within encrypt component 354 or any other suitable processing. To implement such post-processing within board 210, operation 358 or other portion of programmable logic 250 may be configured to exchange processed data with other components within the cloud computing platform. Though, it should be appreciated that any suitable means may be employed for post processing.

With this multistep process of validating and configuring programmable logic 250, board 210 may be allocated to a customer, configured for uniquely operating with that customer, configured by the customer and then used for securely performing processing as specified by the customer. Each of these operating steps may depend on security information, serving the function of restricting unauthorized parties from either accessing or tampering with the programming or data processed within board 210. The steps may even preclude the operator of the cloud computing platform from gaining unauthorized access.

The process of securely configuring board 210 to perform an operation for a specific customer 132A may be repeated to reconfigure board 210 for other operations as specified by the specific customer. Reconfiguration, for example, may be performed by repeating the acts illustrated in FIGS. 3C and 3D—though with encrypted program 138 defining a different operation. Moreover, board 210 may be reallocated to a different customer. Reallocation may occur, for example, by repeating the acts illustrated in FIGS. 3A and 3B—though using security information for a different customer to generate keys 332 and using different security information and/or programming logic to implement set of instructions 334 that will become a loader for the specific customer.

Figure 3E:
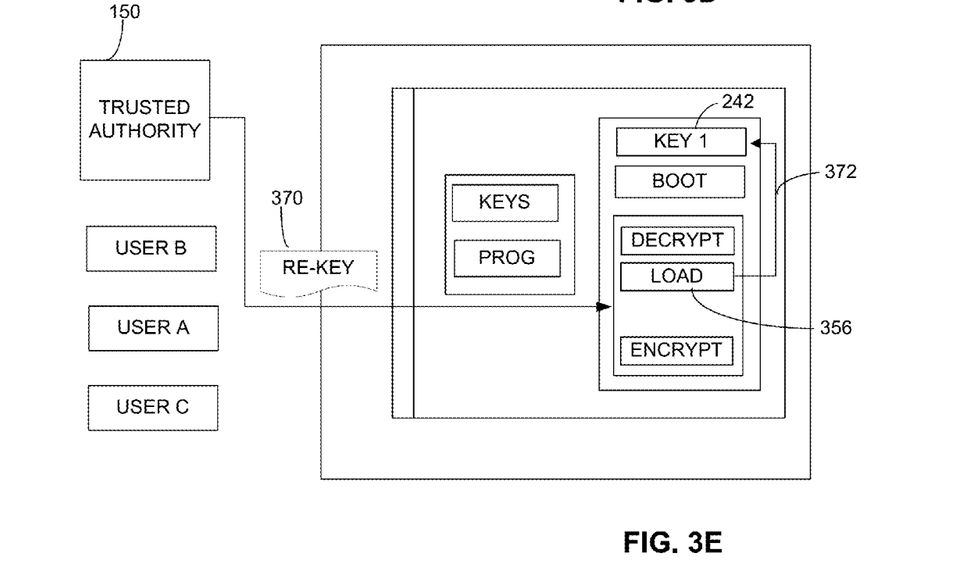

In the embodiments illustrated in FIGS. 3A . . . 3D, board 210 is configured in advance for a specific trusted authority and for a specific key used by that trusted authority. In some embodiments, board 210 may also be constructed to be reprogrammed to use a different key for processing information received from a trusted authority. FIG. 3E illustrates such an embodiment.

In the example of FIG. 3E, reprogramming path 372 is provided between programmable logic 250 and key storage 242. Reprogramming path 372 allows security information extracted from a communication received at board 210 to be written into key storage 242. Programmable logic 250 may be configured in any suitable way to receive a communication specifying a new key, process that information to extract the key and provide the extracted key over reprogramming path 372. In the embodiment illustrated in FIG. 3E, loader 356 may be implemented with instructions configured to receive re-key information 370 from trusted authority 150.

In other embodiments, boot circuitry 244 may be configured to identify a set of instructions stored in memory 230 that, when executed, control the re-key operation. In such an embodiment, a re-key operation may entail writing a set of instructions to memory 230, resetting programmable logic 240 to trigger operation of boot circuitry 244 on those instructions and then allowing those instructions to execute the re-key process.

Figure 4:
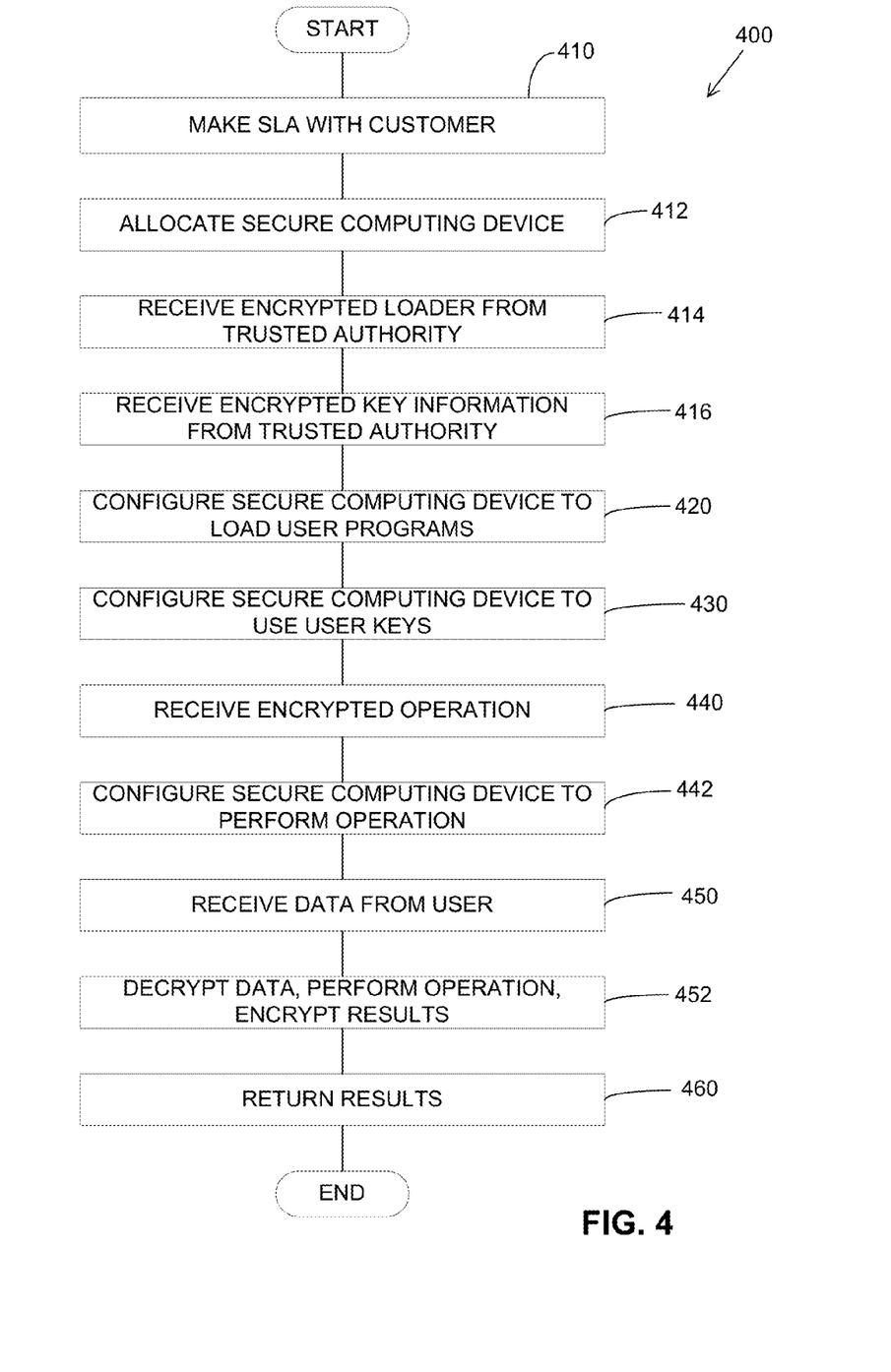
FIG. 4 is a flowchart of an exemplary method of configuring and operating a cloud computing platform using a secure computing device.

Turning now to FIG. 4, an exemplary method of operating a cloud computing service is illustrated. Method 400 begins at act 410, where an operator of cloud computing service may make a service level agreement (SLA) with a specific customer. That SLA may specify secure computing resources.

Accordingly, at act 412, a secure computing device may be allocated for use by the specific customer. Such a secure computing device may be in the form of board 210 (FIG. 2). Though, it should be appreciated that a secure computing device in any suitable format may be used. Allocation may be performed in any suitable way in which the cloud computing platform is configured to route information for secure processing on behalf of a specific customer to the allocated secure computing device. Thereafter, operation of the secure computing device may occur without intervention of the operator of the cloud computing platform.

At act 414, the secure computing device may receive an encrypted loader from a trusted authority. At act 416, the secure computing device may receive encrypted key information from the trusted authority. At acts 420 and 430, the secure computing device may be configured based on the received encrypted loader and the received encrypted key information, respectively.

At act 440, the secure computing device may receive encrypted information specifying an operation to be performed on customer data. In act 442, the secure computing device may be configured to perform that operation.

As the customer generates data to be processed in accordance with the operation, the secure computing device may receive that data in act 450. In act 452, the secure computing device may decrypt the data, perform the operation and encrypt the results. As part of act 416, the encrypted results may be returned to the customer or sent to any other suitable destination for use or further processing. Though not expressly illustrated, the results may be forwarded to another component of the cloud computing platform for additional processing. The results may be sent to such a component in either encrypting or unencrypted form. In this way, secure processing may be performed, even in a cloud computing platform operated by an entity that is not fully trusted and that is accessed by communications over a public network.

Figure 5:
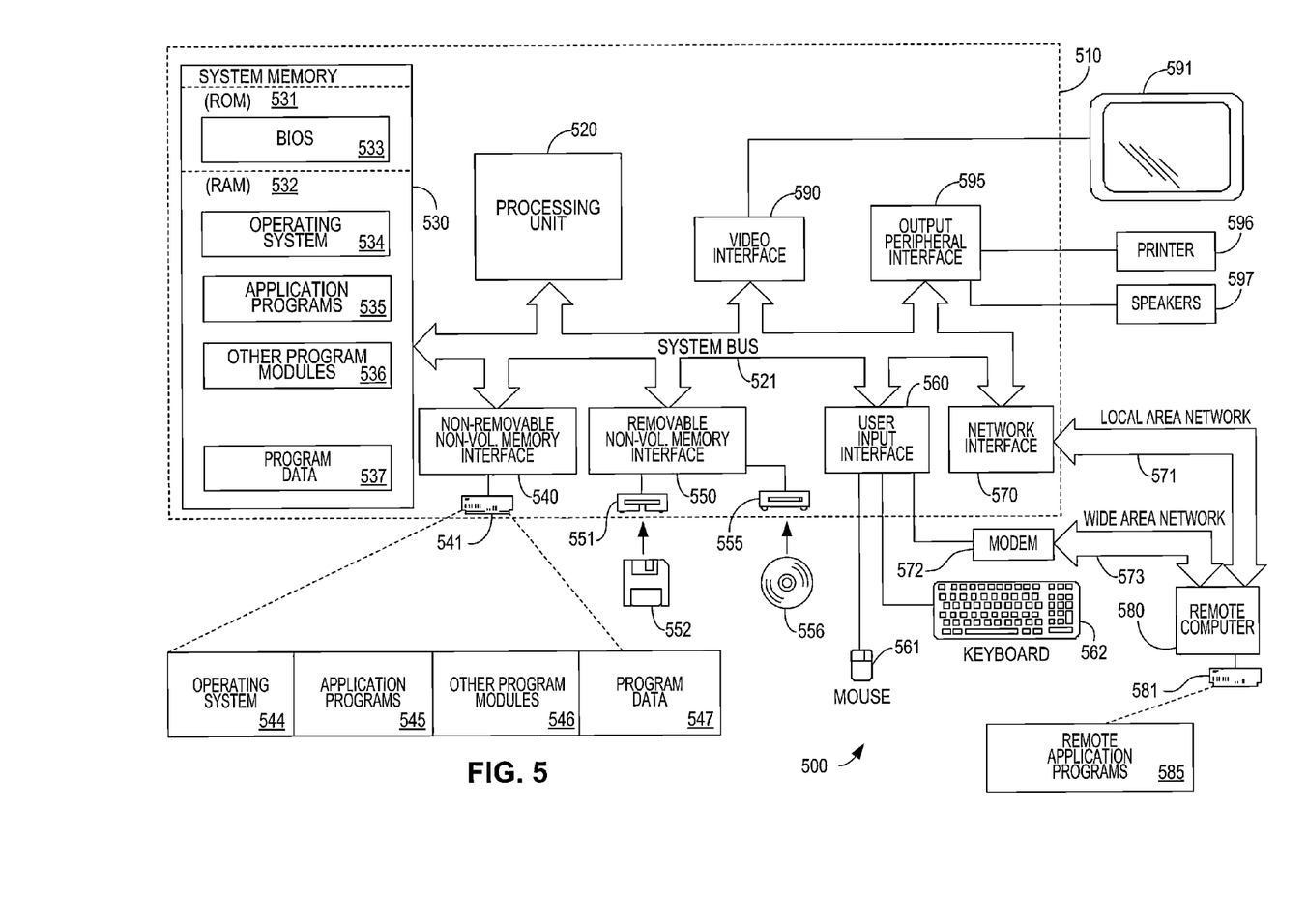
FIG. 5 is a functional block diagram of an exemplary computing device that may be used to implement some embodiments of the invention.

FIG. 5 illustrates an example of a suitable computing system environment 500 on which the invention may be implemented. Computing system environment 500, for example, may represent a computing node in a cloud computing platform or may represent a client computing device, utilized by a customer, such as customer 132A, to access a cloud computing environment, to develop sets of instructions or perform other functions as described herein. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through an non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through a output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Specific examples of techniques to configure basic care computing device have been provided. It should be appreciated that it is not a requirement of the invention that configuration information be obtained in exactly the manner illustrated. For example, an embodiment is described in which a key (118A) was stored in the secure computing device in a secure environment managed by a trusted authority. However, other suitable techniques for configuring the secure computing device with such a key may be employed. As an example of alternative approaches, such a key may be stored in the secure computing device as part of its manufacture or may be communicated to the secure computing device using a key distribution protocol. For this purpose, a known key distribution protocol may be used.

As another example of an alteration, an embodiment was described in which an encrypted program was uploaded to the secure computing device by a customer desiring to process data in accordance with that program. Such a program, however, may be uploaded to the secure computing device from any source. For example, a trusted authority may receive the program and validate it and then upload it to the secure computing device.

Moreover, it should be recognized that, though specific actors are described, specified actions may be performed by individuals, or machines if the actions are performed automatically, working on behalf of those actors without departing from the scope of the invention. For example, the described actions of generating and communicating security information, programs for execution in the secure cloud environment or data on which secure operations are to be performed may be performed by individuals or machines working on behalf of the specified actors.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An apparatus comprising:
a programmable secure computing device associated with a cloud computing platform, wherein the programmable secure computing device is coupled to a network and at least one computing device of the cloud computing platform in order to provide a secured cloud computing service, the programmable secure computing device comprising:
first programmable circuitry to store security information;
second programmable circuitry to execute at least one programmable function, based at least in part on the security information and information received over the network, the at least one programmable function generating processed information that comprises clear text data;
control circuitry to:
receive and store the security information in the first programmable circuitry;
receive and store information defining the at least one programmable function in the second programmable circuitry;
validate the at least one programmable function based on the security information and use the security information to decrypt and encrypt data exchanged with a customer during execution of the at least one programmable function; and
provide at least a portion of the clear text data from the programmable secure computing device to the at least one computing device of the cloud computing platform.

2. The apparatus of claim 1, wherein:
the programmable secure computing device comprises at least one field programmable gate array; and
the field programmable gate array comprises the first programmable circuitry and the second programmable circuitry.

3. The apparatus of claim 1, wherein:
the programmable secure computing device is coupled to the at least one computing device over a Peripheral Component Interconnect (PCI) bus.

4. The apparatus of claim 3, wherein:
the programmable secure computing device is a network interface card.

5. The apparatus of claim 1, wherein:
the programmable secure computing device is physically integrated within the at least one computing device.

6. The apparatus of claim 1, further comprising a plurality of programmable secure computing devices to provide the secured cloud computing service to a plurality of customers, wherein each of the plurality of customers is associated with a corresponding programmable secure computing device comprising programmable circuitry to store security information unique to that customer.

7. A method of operating a cloud computing service on a cloud computing platform for a customer, the method comprising:
operating a secure computing device, wherein operating the secure computing device further comprises:
validating instructions provided by a trusted authority, the instructions for receiving and loading an encrypted program from the customer;

verifying that the encrypted program was generated for the customer based on security information provided by the customer;
configuring the secure computing device to perform an operation on the cloud computing platform, wherein the operation is specified by the encrypted program;
receiving encrypted data;
generating processed data from the encrypted data, wherein the processed data comprises a portion of data that is determined to be less sensitive than the encrypted data; and
providing the portion of data from the secure computing device to a different computing device of the cloud computing service on the cloud computing platform.

8. The method of claim 7, further comprising:
obtaining the security information associated with the customer.

9. The method of claim 8, wherein the security information is provided by the customer.

10. The method of claim 8, further comprising decrypting the encrypted data based at least in part on the security information associated with the customer to generate decrypted data and performing the operation on the decrypted data.

11. The method of claim 7, further comprising:
allocating the secure computing device for the customer from a pool of secure computing devices; and
configuring the secure computing device for operating with the customer and for not operating with any other customers of a plurality of customers of the cloud computing service.

12. The method of claim 7, further comprising:
physically integrating the secure computing device and the different computing device.

13. The method of claim 12, wherein:
physically integrating the secure computing device and the different computing device comprises installing the secure computing device on an internal bus of the different computing device.

14. The method of claim 7, further comprising:
operating the different computing device to generate second processed data based at least in part on processing the processed data received from the secure computing device and to provide the second processed data to the secure computing device; and
operating the secure computing device to generate processed cyphertext based at least in part on the processed second data and to transmit the processed cyphertext over a network.

15. A method of operating a cloud computing service, the method comprising:
allocating a secure computing device, coupled to at least one computing device of the cloud computing service, to a customer;
operating the secure computing device to:
configure the secure computing device to perform an operation specified by the customer based at least in part on first security information associated with the customer and information provided by a trusted authority that is used to validate a set of instructions for performing the operation;
receive encrypted data from the customer;
decrypt the encrypted data based on second security information associated with the customer, the second security information different than the first security information; and
perform the operation specified by the customer on the decrypted data, wherein the operation specified by the customer is performed in the secure computing device of a cloud computing platform.

16. The method of claim 15, wherein:
operating the secure computing device to configure the secure computing device comprises configuring the secure computing device based on configuration information without access by an administrator of the cloud computing service to the configuration information.

17. The method of claim 15, wherein:
operating the secure computing device to configure the secure computing device comprises programming a field programmable device within the secure computing device.

18. The method of claim 17, wherein:
the programming the field programmable device is performed by boot loading circuitry in the field programmable device.

19. The method of claim 18, wherein:
operating the secure computing device further comprises operating the secure computing device to:
interact over the network with a trusted third party to obtain security information.

20. The method of claim 19, wherein:
the first security information comprises a first key and the second security information comprises a second key;
operating the secure computing device further comprises operating the secure computing device to:
with the first key, validate the set of instructions as being associated with the customer; and
with the second key, decrypt the encrypted data received from the customer.

* * * * *